Dec. 1, 1970 T. A. CONANT, JR 3,545,003

MODIFIED PHASE MODULATION MAGNETIC RECORDING SYSTEM

Filed Oct. 7, 1968 2 Sheets-Sheet 1

INVENTOR:
THEODORE A. CONANT, JR.

BY Joseph Dwyer
ATTORNEY

Dec. 1, 1970 T. A. CONANT, JR 3,545,003

MODIFIED PHASE MODULATION MAGNETIC RECORDING SYSTEM

Filed Oct. 7, 1968 2 Sheets-Sheet 2

*INVENTOR:*
THEODORE A. CONANT, JR.

BY Joseph R. Dwyer

*ATTORNEY*

United States Patent Office 3,545,003

Patented Dec. 1, 1970

3,545,003

MODIFIED PHASE MODULATION MAGNETIC RECORDING SYSTEM

Theodore A. Conant, Jr., Sylmar, Calif., assignor to Singer-General Precision, Inc., a corporation of Delaware Filed Oct. 7, 1968, Ser. No. 765,281
Int. Cl. G11b *5/04*
U.S. Cl. 346—74 5 Claims

ABSTRACT OF THE DISCLOSURE

A system for digital recording on a magnetic memory is provided which is compatible with the self-clocking type of magnetic recording and reproducing system utilizing zero-cross read amplifiers. The system of the invention retains the basic characteristics of phase modulated digital recording, but it eliminates the undesired phase shift inherent in the reproduction of such recording in the prior art systems. This elimination of phase shift is achieved by forcing a temporary complementation in the wave form of the recorded signal at selected points thereon.

BACKGROUND OF THE INVENTION

Digital data is commonly stored in data processing systems on a movable magnetic recording medium by introducing electrical signals representing the data to a magnetic recording or write head. The magnetic recording medium is then subjected to magnetic fields from the write head which, for example, cause the recording medium to be brought to the saturation level in each of the two magnetic polarity directions. In one such recording system, for example, magnetization of the recording medium in one direction represents the binary value "1," and magnetization of the recording medium in the other direction represents the binary value "0."

The recording system described in the preceding paragraph, which is commonly known as the "non-return-to-zero" type of recording, may also be phase modulated. If so, the signal applied to the write head is one in which the binary 0's are each represented by a cycle of alternating voltage of one phase, and the binary 1's are each represented by a cycle of alternating voltage of the same frequency but in phase opposition with the former.

In any digital magnetic recording system, the wave form of the signal applied to the write head tends to become changed and distorted when it is recorded on the medium and subsequently read by the read head. Therefore, some correction must be applied to the signal since the binary information is contained essentially in the timing of the signal. It will be appreciated, therefore, that any spurious change in the timing of the signal produces a deleterious effect on the binary information represented thereby. The correction afforded by the system of the present invention is particularly applicable to the aforesaid type of return-to-zero recording, since it serves to prevent spurious 90° phase shifts in the reproduced signal which, in turn, produce corresponding errors in the binary data transmitted through the system.

The system of the present invention serves, therefore, to improve the timing accuracy of the binary data stored in the magnetic memory of a data processing system, and this permits the bit density on the recording medium of the memory to be increased. It is important, naturally, to achieve as high a bit density as possible on the magnetic recording medium, since the storage space requirements of the memory desirably should be maintained at a minimum.

DETAILED DESCRIPTION OF THE ILLUSTRATED EMBODIMENT

As mentioned above, the following description is directed to a system of recording which is intended to be compatible with the self-clocking type of return-to-zero binary digit magnetic recording system using zero-cross read amplifiers. The system to be described retains the basic characteristics of phase modulated recording, but it eliminates undesirable phase shft of the zero crossings caused by the half frequency components of the recorded signal, as will be described.

As will also be described, the amplitude difference between the full frequency components, and the half frequency components of the recorded signal is reduced in the circuit and system of the invention. This reduction is accomplished by forcing a temporary complementation at each point in the recording wave form where it would not ordinarily occur in the usual prior art phase modulation. The complementation is achieved by means of a correction pulse. The duration of the correction pulse is less than the current rise time, and it produces two successive peaks in the recorded signal wave form on the same side of the base line. The correction afforded by the system of the invention provides for the full frequency and half frequency amplitudes of the recorded signal to approach equality, with a concomitant decrease in base line timing phase shift effects. More importantly, the zero crossings of the recorded signal now occur as being either a half period or full period, and without any intermediate falsely timed crossings, as is the case with the usual prior art phase modulation recording.

In the phase modulation binary data recording system, or double frequency recording as it is sometimes called, and where the read signal is continuous, the primary object of the system of the invention is to restore the original rectangular wave shape of the input. This is achieved basically by restoring the proper amount of third harmonic of the low frequency component represented, for example, by the binary 0's in the read signal, while the high frequency wave shape, for example, the binary 1's is represented only by the fundamental. The result is that the zero axis cross over points of either the 0's or the 1's in the recorded signal represents the timing of the original rectangular input wave shape with high accuracy. The subsequent processing of the reproduced signal is very simple, in that the signal need merely be amplified and amplitude limited to reform completely the shape of the rectangular input.

Figure 1:
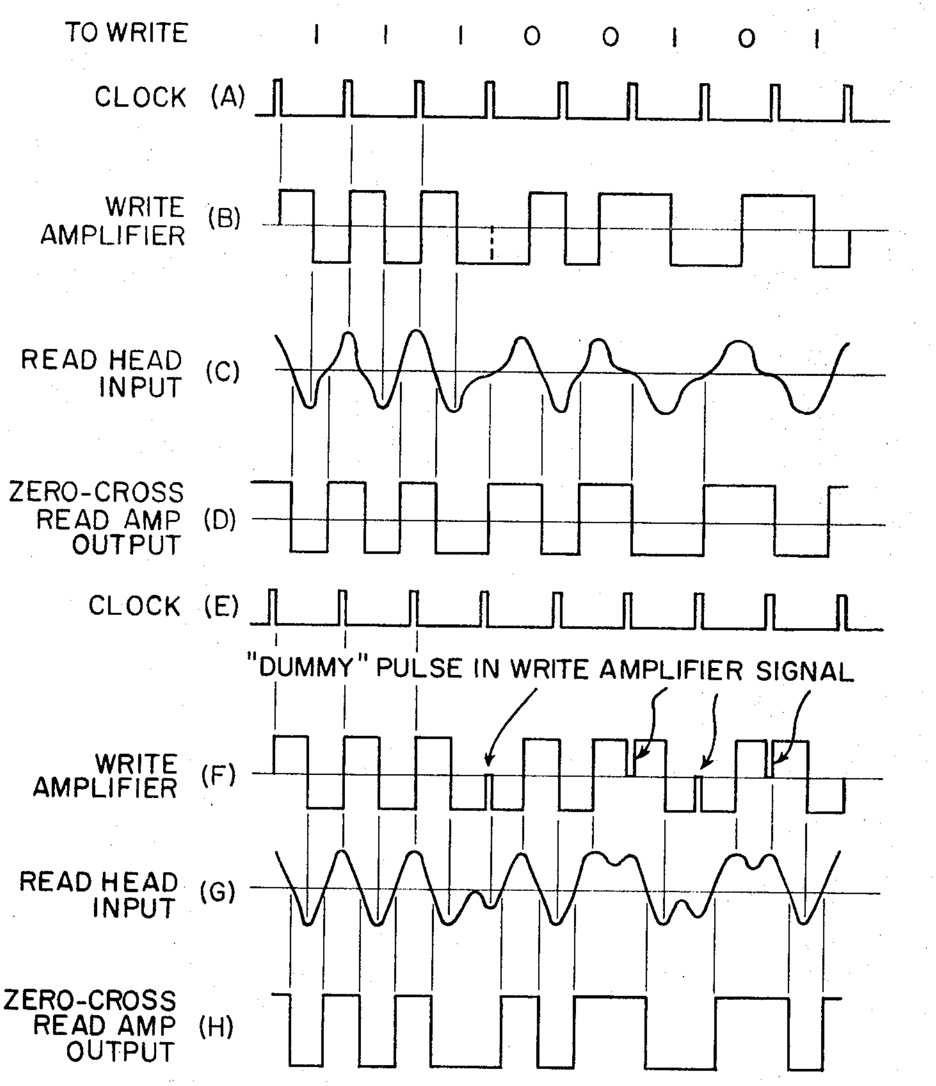
FIG. 1 is a series of curves useful in explaining the type of recording system to which the present invention is applicable, and the manner in which timing corrections are effected in the signal by an application of the concepts of the invention.

In the curves shown in FIG. 1, the binary signal 11100101, for example, is recorded in the magnetic memory by the usual phase modulation type recording. With such recording, the clock pulses (curve A) applied to the write amplifier in conjunction with the input data cause the write amplifier to produce a square wave of a particular phase and frequency, so long as binary 1's are being recorded. However, when the recording of a particular binary value, such as binary 1, is followed by the recording of the opposite binary value, such as binary 0, and as shown in curve B of FIG. 1, the signal produced by the write amplifier is reversed in phase, so that the resulting signal produced by the write amplifier, as shown in curve B, periodically exhibits half-frequency characteristics.

In the absence of the corrective system of the present invention, and when the signal produced by the write amplifier in a prior art system, as shown by the curve B of FIG. 1, is recorded on the magnetic medium, and subsequently read by the read head of the system, the zero crossing point of the wave form, as shown in the curve C of FIG. 1, shifts 90° for each of the half-frequency portions. This phase shift of the reproduced signal is spurious, and it produces a resulting signal, when amplified and amplitude limited, such as shown in the curve D, which is not the true replica of the input signal of the curve B.

In the system of the present invention, the desired correction is made by inserting a "dummy" pulse, as shown in the curve F of FIG. 1, at each of the half frequency peaks. This correction pulse is in a direction to force a temporary complementation at each such peak. As mentioned above, the duration of each correction pulse is less than the current rise time, and such pulses cause two successive peaks to occur on the same side of the base line for each half frequency amplitude peak, and as shown by the curve G of FIG. 1. The result is that the full frequency and half frequency cycle amplitudes become more or less identical, so that the zero crossing now occurs precisely at the full or half period points, so that the aforesaid 90° phase shift is prevented.

The result of the amplification and amplitude limiting of the wave form G of FIG. 1, as derived from the read head in which the correction technique of the present invention is used, is now a true replica of the input wave form of curve B, as shown by the curve H of FIG. 1. The correction effect described above may be achieved, for example, by the logic control system of FIG. 2, which is incorporated into the write system of the invention between, for example, the write amplifier and the write head.

Figure 2:
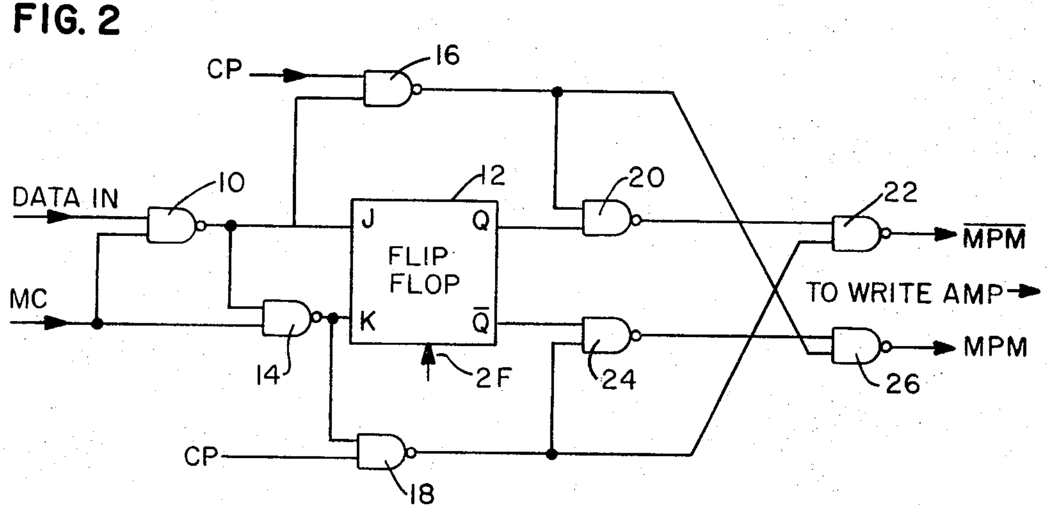
FIG. 2 is a logic diagram of an appropriate write circuit incorporating the invention.
Figure 3:
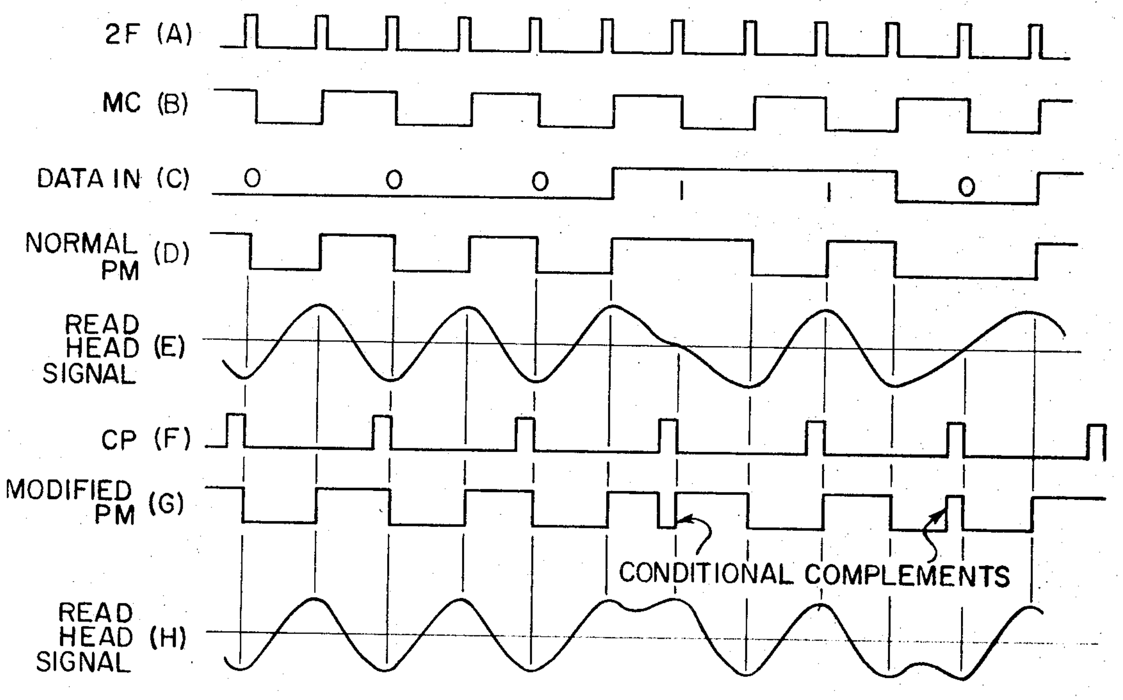
FIG. 3 is a further series of curves useful in explaining the operation of the system of FIG. 2.

In the system of FIG. 2, the data input, as represented by the curve C of FIG. 3 is applied to a "nano" gate 10, the "nano" gate being connected to the J input terminal of a flip-flop 12 and to further "nano" gates 14 and 16. A double frequency train of clock pulses "2*f*" are applied to the flip-flop 12, these being represented by the curve A of FIG. 3. A square wave MC having the frequency of the double frequency clock pulses is applied to the "nano" gates 10 and 14. This square wave is shown by the curve B of FIG. 3.

A series of clock pulses having half the frequency of the clock pulses 2*f*, and as shown by the curve F of FIG. 3, are applied to the "nano" gate 16, and to a further "nano" gate 18. The Q output terminal of the flip-flop 12 is connected to a "nano" gate 20, which, in turn, is connected to a "nano" gate 22. The $\overline{Q}$ output terminal of the flip-flop 12 is connected to a "nano" gate 24, which, in turn, is connected to a "nano" gate 26.

The "nano" gate 16 is connected to the "nano" gates 20 and 26, whereas the "nano" gate 18 is connected to the "nano" gates 24 and 22. The modified phase modulation output is derived from the output of the gate 26, and its complement is derived from the output of the gate 22. The resulting output signals are applied to the write amplifier.

In the system of FIG. 2, the flip-flop 12 is normally triggered from one state to the other by the successive clock pulses 2*f*. In the particular example, illustrated by the curves of FIG. 3, and so long as the data input is a binary 0, the square wave MC is passed to the output terminals unchanged in phase. However, when the data input changes from the binary 0 to the binary 1, the square wave MC is inverted in phase, as shown by the curve D of FIG. 3, and is passed to the ouput with inverted phase.

The aforesaid phase inversion continues until the system again returns to binary 0, at which time, and as shown by the curve D, the square wave MC recovers its original phase. As mentioned above, the resulting signal appearing at the output of the prior art system, and as shown by the curve D of FIG. 3 is a square wave which from time to time exhibits half frequency portions. As also mentioned above, the half frequency portions produce undesired 90° phase shifts in the zero crossing points, as shown by the curve E of FIG. 3.

The above described correction is made in the wave form written by the system of the present invention into the magnetic recording medium. This is achieved by the provision of the half frequency clock pulses CP which are applied to the "nor" gates 16 and 18. Only the half frequency portions of the phase modulated signal from the flip-flop 12 have the proper phase relationship to permit the clock pulses CP to be introduced into the outputs so as to modify the output, as shown in the curve G of FIG. 3. The logic gates of FIG. 2 are connected so that for each positive half frequency component in the output, a conditional complement in the form of a negative going clock pulse CP is interposed into the wave form; whereas for each negative half frequency cycle, a positive clock pulse conditional complement is introduced, as shown by the curve G.

By forcing such a temporary complementation at each point in the recording where the half frequency amplitude occurs, the difference between the full and half frequency amplitudes is reduced, and become more identical, so that the base line phase shift conditions are reduced and the resulting signal from the read head, as shown by the curve H of FIG. 3, may be subsequently amplified and amplitude limited, so as to provide a proper replica for the data input wave of the curve C.

The invention provides, therefore, an improved recording system of, for example, the phase modulation or double frequency type, in which a continuous read signal is produced whose timing is in proper correspondence with the corresponding input signal, so that the replica of the input signal may be simply regained, and so that all the binary information contained in the input signal may be correctly reproduced.

What is claimed is:

1. A magetic recording system for recording binary coded electrical signals from a source on a recording medium by means of an electromagnetic write head, said system producing an alternating voltage wave of reversible phase having full frequency components and half frequency components representing said binary cooled electrical signals and said system including circuitry coupled to said source for interposing controlled distortions into said alternating voltage wave to prevent zero crossing phase shifts normally caused by said half frequency components of said wave.

2. The system defined in claim 1, in which said circuitry includes means for introducing a third harmonic component into said half frequency component.

3. The system defined in claim 1, in which said circuitry includes means for introducing complementation pulses into said alternating voltage wave during said half frequency components.

4. The system defined in claim 3, in which said circuitry includes a flip-flop, means for introducing a square automatic voltage wave to said flip-flop, and means controlling said flip-flop to invert the phase of said square alternating voltage wave for each change of the binary value represented by said binary coded signals.

5. The system defined in claim 4, and which includes logic gates coupled to said flip-flop, and means for introducing pulses of the frequency of said square waves to said gates for producing said complementation pulses into said automatic voltage wave during said half frequency components thereof.

References Cited

UNITED STATES PATENTS 3,488,662 1/1970 Vallee ------------ 340—174.1

STANLEY M. URYNOWICZ, Jr., Primary Examiner

G. M. HOFFMAN, Assistant Examiner

U.S. Cl. X.R.

340—174.1